(12) United States Patent
Grigori

(10) Patent No.: US 8,540,415 B2
(45) Date of Patent: Sep. 24, 2013

(54) MULTIPURPOSE MANUAL MIXER

(76) Inventor: Georgeta Grigori, Melbourne (AU)

( * ) Notice: Subject to any disclaimer, the term of this patent is extended or adjusted under 35 U.S.C. 154(b) by 0 days.

(21) Appl. No.: 13/255,907

(22) PCT Filed: Mar. 25, 2010

(86) PCT No.: PCT/AU2010/000274
§ 371 (c)(1),
(2), (4) Date: Sep. 10, 2011

(87) PCT Pub. No.: WO2010/102336
PCT Pub. Date: Sep. 16, 2010

(65) Prior Publication Data
US 2012/0008454 A1  Jan. 12, 2012

(30) Foreign Application Priority Data

Mar. 12, 2009 (AU) ............................... 20090901097
Nov. 9, 2009 (AU) ............................... 20090101139

(51) Int. Cl.
*B01F 15/00* (2006.01)
*B01F 7/00* (2006.01)
*B01F 13/00* (2006.01)

(52) U.S. Cl.
USPC .... 366/129; 366/343; 366/325.93; 366/328.3

(58) Field of Classification Search
USPC ................. 366/325.92–325.93, 328.2–328.4, 366/605, 129, 604, 342
See application file for complete search history.

(56) References Cited

U.S. PATENT DOCUMENTS

| 360,636 | A | | 4/1887 | Wayland |
| 419,585 | A | * | 1/1890 | Crapo ........................... 220/697 |
| 785,249 | A | * | 3/1905 | Burnham ........................ 416/76 |
| 1,241,307 | A | * | 9/1917 | Tomkins ....................... 366/129 |
| 1,281,610 | A | | 10/1918 | Lundahl |
| 4,339,992 | A | * | 7/1982 | Kurland ......................... 99/348 |
| D304,893 | S | | 12/1989 | Scaggs |
| 6,619,833 | B1 | | 9/2003 | Skudelny |
| 7,384,188 | B2 | * | 6/2008 | Waggoner et al. ............. 366/247 |
| 7,887,230 | B2 | * | 2/2011 | Rosso et al. ................... 366/129 |

* cited by examiner

*Primary Examiner* — Tony G Soohoo
*Assistant Examiner* — Anshu Bhatia

(57) ABSTRACT

The disclosed multipurpose manual mixer is a new kitchen utensil in one piece comprised of a handle attached to a mixer to the other end, resembling a helicopter with propeller like plates. A multipurpose manual mixer with its entire structure in one piece made up of a long and uneven handle at one end and flat rectangular pieces with rounded corners, propellers like big and small, holed and un-holed attached vertically to a tubular body to the other end in continuous rows, parallel and separated from each other at equal distance. The multi flat rectangular pieces as mentioned and described above are all called plates. The body comprised of all plates big and small and attached vertically along to the cylindrical tubular part in the middle, is called 'the mixer.' In other words, 'the mixer' consists of multiple flat rectangular plates rounded in corners on one side, big and small, holed and un-holed and bound to each other by a receiving tubular part that also fits the handle. This invention called 'multipurpose manual mixer' has been specially designed in order to provide an improved manual mixer of simple, cheap, effective and readily reusable construction. It adds quality to the finishing product—food simple or complex and ends up to being a very useful tool in the kitchen.

7 Claims, 2 Drawing Sheets

MULTIPURPOSE MANUAL MIXER

For many years manual mixing devices of various kinds like: spoons, forks, scrapers, spatulas have consisted of one stick for a handle attached to a sculptured one side oval or flat end at the base, allowing for just a portion of food mixture at a time to be blended, mixed, stirred or mashed manually.

Said devices are used for mixing cakes, ice cream, beating eggs, mixing thick soups, broths, stews and mashing vegetables such as potatoes and pumpkins and the like.

This invention relates to the type of utensil needed for a long time in the kitchen, because of its versatility and utility and has been specially designed in order to provide an improved manual mixer of simple, cheap, effective and readily reusable construction.

The Multipurpose Manual Mixer is so designed for mass production by the plastic injection moulding process.

A problem often encountered by the already mentioned devices commonly available on the market, is that they fail to allow for easy and complete homogeneous mixing because the mixing vanes of said hand mixers are of a common size and do not allow the mixture to flow through the mixing vanes of said mixer as the viscosity and homogeneity of said mixture changes during the mixing process.

It is the purpose of this invention to overcome the problems of existing hand mixers by the invention so described below which allows for more easily and complete mixing in less time and with less manual effort.

A Multipurpose Manual mixer made up of a long, uneven sculptured handle (with a hole at the top end) and attached to a cylindrical tubular part with 12 blades different in size and shape to its' lower end.

The handle is comprised of a grip portion and a head at one end and an attachment portion to the other/lower end.

The attachment portion at the lower end of the handle has a rounded/trapezium like circled edge that fits perfectly the rounded hole/slope of the tubular body. The handle is permanently attached to the cylindrical body with the blades emanating from it and constituting together one piece.

The handle, which is a long, tapered round rod, increases its' thickness from its' lower point in the rounded/trapezium like joint/connection with the cylindrical body; and while building up more material, towards the other/upper end, it is taking an oval/curved shape (resembling an egg); and after decreasing for a while, it starts increasing again, finishing in a round head at the top, with a through hole in it—half circle, half two sides of an angle pointed downwards that allow the long circular member to be inserted in order to provide a T grip for more easy mixing of highly viscous, materials and also for easy storage by hanging on a hook.

When the long circular member is inserted through the top hole in the handle and moved in rotating movements, the entire Manual Mixer is rotating and executing the type of work needed in the type of food we want to.

It helps the mixer to perform better and quicker when mixing in certain foods.

The invention is embodies in its preferred form by the combination of 12 symmetrically radially placed mixing blades at equal intervals emanating from the lower end of the mixing handle (circular body) said mixing handle being higher in overall length said radially placed blades having two forms: the first form being a full height blade placed at certain degrees radial intervals around the lower end of said mixing handle wherein said blades also include typically three holes larger in diameter said holes being provided to allow the components of the mixture to flow through said holes to allow for better and more thorough mixing and interposed between said full height blades are much lower in height (approx. 4 times) blades also radially spaced at certain degree intervals at lower end of said mixing handle and interposed at equal intervals between said higher mixing bladed.

The Multipurpose Manual Mixer' has 12 symmetrically radially blades attached to its' lower end where 6 of the said blades are interposed between other said 6 radially displaced blades, but much smaller in size, different shaped (and with no perforated holes) when compared to the other higher and holed 6 said blades; these small said blades are rather resembling right angle trapezium/quadrilateral with two parallel sides like: one medium size side which is parallel to the smaller size side and two longer, unequal sides; the medium size side is vertically (right angle) attached to the said circular body; one of the longer sides is the base of the blade and is joint with the smaller side in a rounded corner; the upper side is slightly curved/bent and joins the medium and the smaller side; with the latest, forming another round corner.

The Multipurpose Manual Mixer with the said long, sculptured handle and the said circular tubular body with the said 12 radially blades attached to the lower end of the handle, where 6 of the said blades are interposed between other said 6 radially displaced blades, but much bigger in size, higher (approx. 4 times) when compared to the other 6 smaller said blades; these higher said blades are rather resembling an incomplete rectangular shape; one of the two longest sides is attached (right angle) to the said tubular cylindrical body; the upper/shorter side is curved/bent at the corner and joint together with the second long and curved (could be also straight) side like a bracket and meets the base line in its' finishing point and forming together a rounded corner; each of the said higher blades have also included/perforated three large holes that contribute to a substantially different look when compared to the smaller blades that have no perforated holes and also, to the general aspect of the Multipurpose Manual Mixer as a whole.

Figure 1:
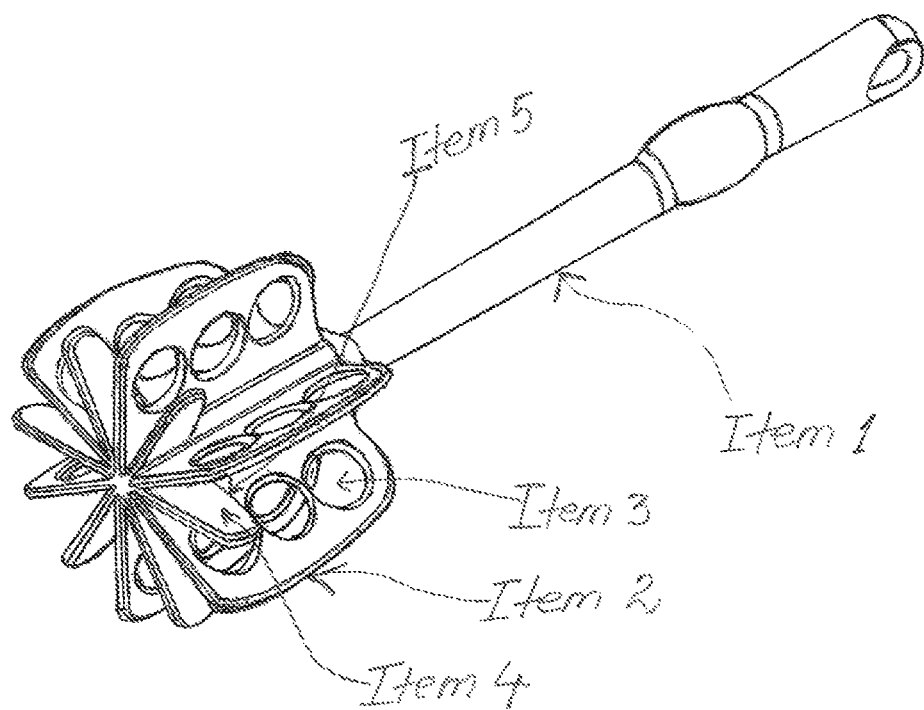
FIG. 1 shows a perspective view of a mixer, according to an embodiment.

The inventions is shown in Pg. 1 FIG. 1, with item 1 being said mixing handle and item 2 being said higher blades and item 3 being said holes in said higher blades and item 4 being said lower in height blades.

In use the Multipurpose Manual Mixer can be used in an up and downwards crushing manner to break larger items such as in the commencement process of mashing potatoes or hard materials and then as the viscosity of material being mashed or mixed changes said Multipurpose Manual Mixer can be rotated manually in so doing causing mixing of materials and when material flows over said height blades said material is encouraged to then flow through said holes in said higher bladed thereby enhancing the mixing process and allowing for more homogeneous mixture to be made in less time than conventional manual mixing devices.

The Multipurpose Manual Mixer, possess rounded corner blades that not only fits the curvature of containers, balls, pots and all kinds of cookware but are making the blending, stirring, scraping, mixing and mashing as a whole much easier and user friendly to.

Looked from bottom, the Multipurpose Manual Mixer has the aspect of the sun surrounded by rays.

The Multipurpose Manual Mixer is so designed that all said mixing bladed are flush with the bottom of said mixing handle so that no material being mixed can escape the rotation of said blades of Multipurpose Manual Mixer.

The lower in height of said mixing bladed includes a slight slope or taper of top edge of some degrees with the connection point to said mixing handle being the high point and the slope or taper downwards towards to outer most edge as shown in Pg. 1 FIG. 1 and item 5.

Figure 2:
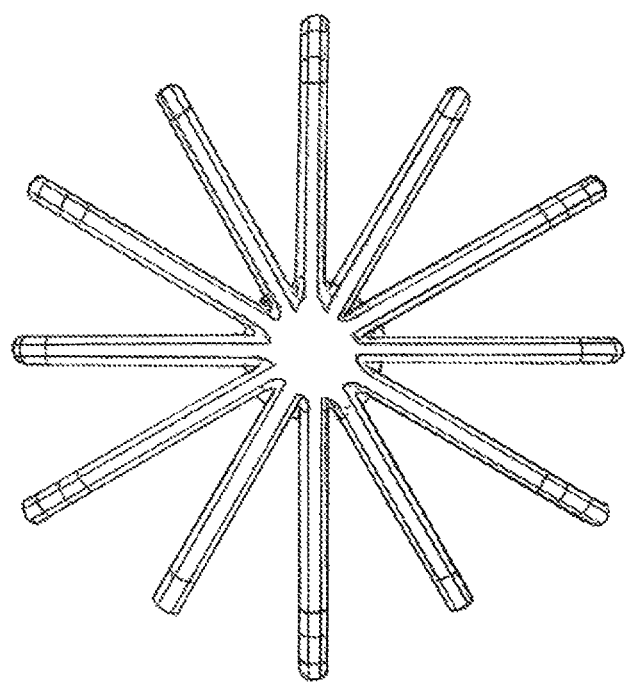
FIG. 2 shows a bottom end view of the mixer from FIG. 1.

Pg. 2, FIG. 2 shows the end view of said Multipurpose Manual Mixer and the 12 radially and symmetrically placed blades.

The invention claimed is:

1. A multipurpose manual mixer comprising: a handle, which is a long, tapered, uneven, sculptured and round rod with a hole at its top end, wherein a long circular member can be inserted; and, attached to the lower end of the handle, a tubular body with twelve blades connected to and extending radially from said tubular body, wherein all twelve blades have a flat shape, wherein six of the blades are smaller in size and without holes and six of the blades are larger in size and comprising holes, wherein the lower edge of all the blades and the lower end of said handle are coplanar in that there is no gap under the blades and said handle when the multipurpose manual mixer stands up on a flat surface, with the lower edge of all the blades and the lower end of said handle facing said flat surface and said handle rising vertically, and wherein the lower edge of all the blades emanates radially from the tubular body.

2. The multipurpose manual mixer of claim 1, wherein the mixer is made of a rigid material and the six blades that are smaller in size and without holes have different shape than, and are interposed between, the six blades that are larger in size and comprising holes; and wherein the shape of the six smaller blades resembles a right angle trapezium, having the upper edge slopped downward towards its distal end, and having the two distal corners rounded.

3. The multipurpose manual mixer of claim 1, wherein the six blades that are larger in size have a height that is substantially four times greater than the height of the six blades that are smaller in size; wherein, each of the six larger blades have three holes; and wherein, the shape of the six larger blades resembles an imperfect rectangle having the entire upper side curved like a single stretched 'S', the distal side outwardly curved and the two distal corners rounded.

4. The multipurpose manual mixer of claim 1, wherein said handle increases its thickness starting from its lower end, and, when approaching the top end, takes an oval shape resembling and egg, and, after decreasing for a while, it increases again finishing in a round top end having said hole that allows said long circular member to be inserted therein in order to provide a 'T' grip for an easier mixing of highly viscous materials, said hole also allowing easy storage by hanging the mixer on a hook.

5. The multipurpose manual mixer of claim 1, wherein the holes in the six larger blades are circular in shape.

6. The multipurpose manual mixer of claim 1, wherein the holes in the six larger blades are oval in shape.

7. The multipurpose manual mixer of claim 1, wherein the mixer is made entirely of plastic.

* * * * *